United States Patent Office 3,032,158
Patented May 1, 1962

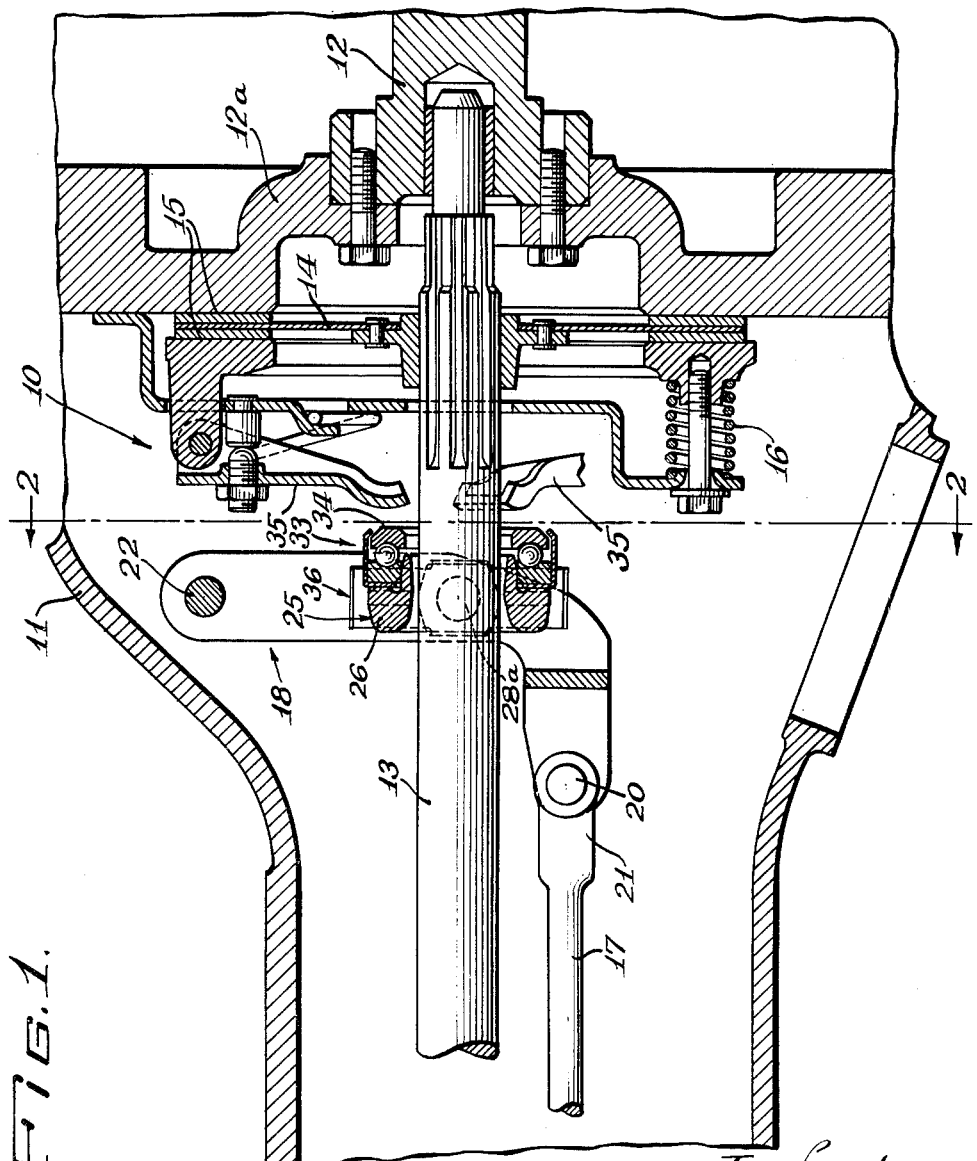

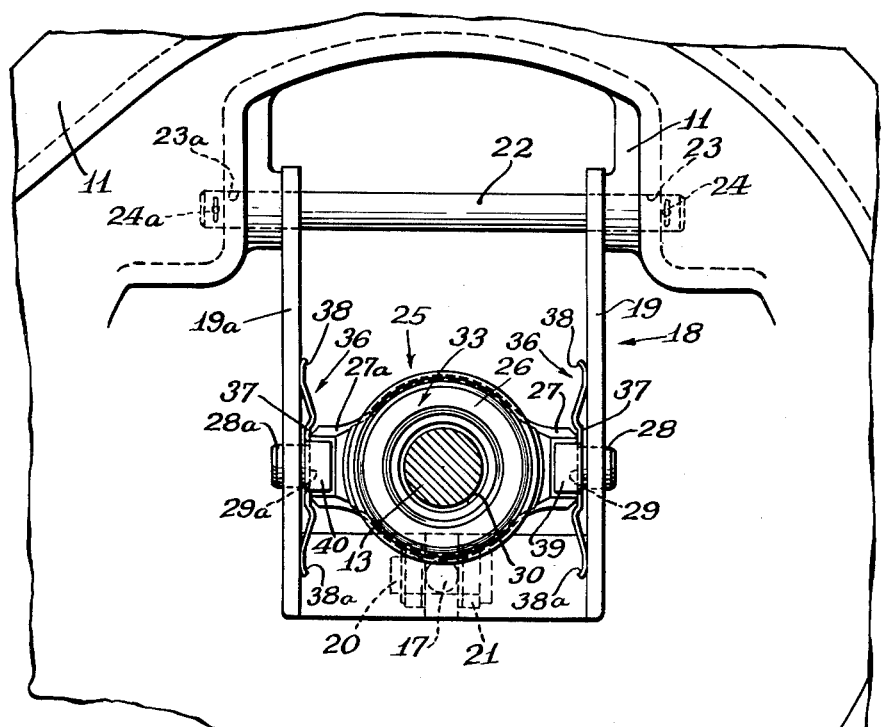
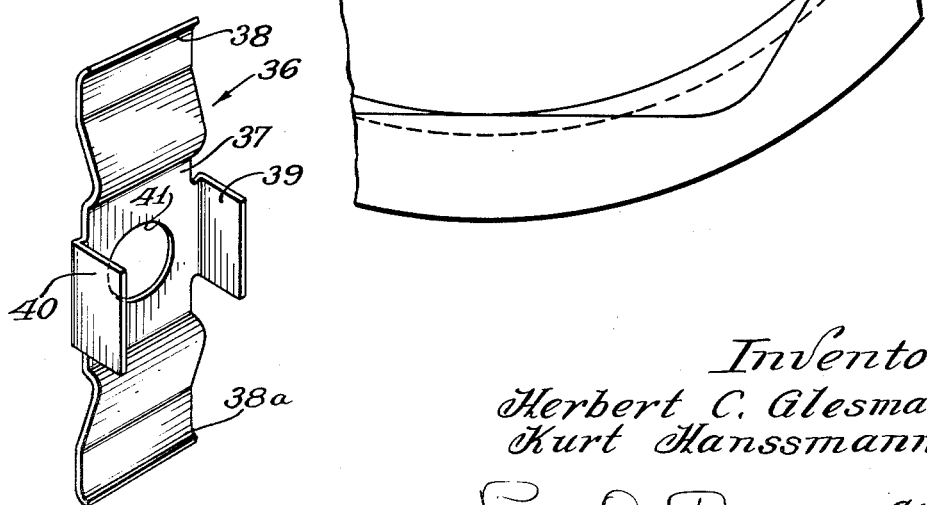

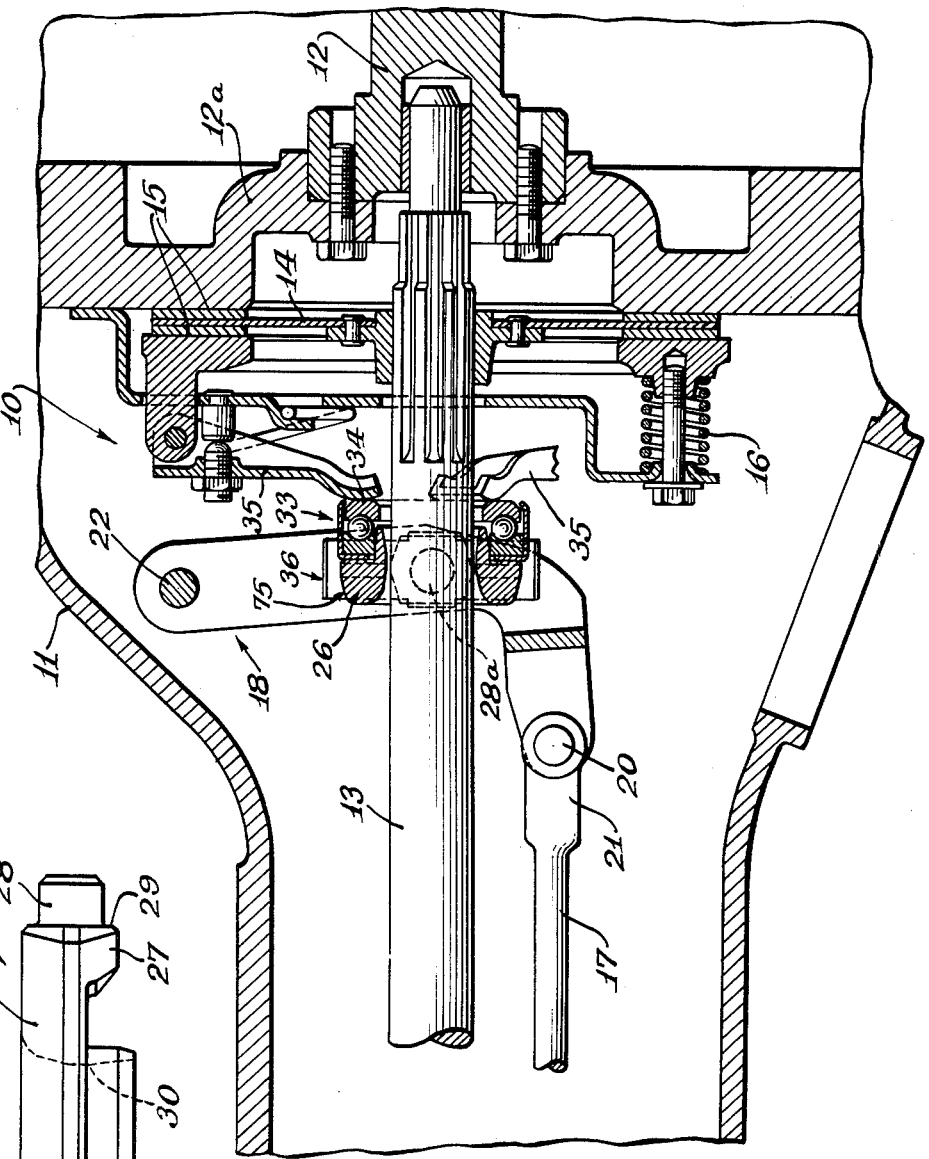

3,032,158
CLUTCH THROW-OUT BEARING
Herbert C. Glesmann and Kurt Hanssmann, Naperville, Ill., assignors to International Harvester Company, Chicago, Ill., a corporation of New Jersey
Filed Dec. 7, 1959, Ser. No. 857,943
4 Claims. (Cl. 192—98)

This invention relates to clutch mechanisms for vehicles, but more particularly it is concerned with the throw-out bearing devices usually employed to effect disengagement of such clutch mechanisms.

More specifically, however, the present invention is directed to the type of throw-out bearing mechanism that slidably encircles or encompasses the output shaft driven by the clutch and, additionally, is supportably carried by suitable mounting means pivotally secured to the clutch housing. In prior art devices of this character the throw-out bearing member was either slidably positioned on a sleeve member that, in turn, was rotatably mounted on the driven shaft of the clutch, or the bearing element thereof, being fashioned of some suitable bearing material such as graphite, was loosely positioned on the clutch output shaft so that said shaft could rotate therewithin while the bearing was concurrently slidably moved axially along the shaft. Both of these prior art types of throw-out devices were known to be objectionable, either, because they were complicated and expensive to fabricate or were noisy and had poor wear characteristics, and it was with the intention of overcoming such defects or objections that the present invention was conceived. It is a prime object, therefore, to provide in the present invention a clutch throw-out bearing assembly, of the type that circumscribes or encompasses a driven shaft without being supportably mounted thereon, which is relatively inexpensive to fabricate, is quiet in operation and is long wearing.

Another object is to provide a clutch throw-out bearing assembly that is simple to adjust, when compensation for wear in the clutch requires a readjustment of the clutch, and which maintains an established setting or adjustment with good dependability.

A further object is to provide a clutch throw-out assembly having means therein to provide for self-alignment of the bearing pressure engaging surface with respect to the clutch finger elements of the associated clutch mechanism.

A still further object is to provide in a clutch throw-out bearing, disposed in radially spaced relation from a driven shaft passed therethrough, means to prevent accidental tipping or tilting of the bearing about an axis transverse to the rotatable axis of the encompassed shaft.

A yet still further object is to provide in a clutch throw-out bearing assembly, operably mounted in radially spaced relation with respect to a driven shaft passed therethrough, leaf spring means reactive between certain of the thrust-transmitting elements thereof and a supporting hanger member for said elements for restricting free rotation or tilting of said elements about an axis transverse to the rotatable axis of said shaft.

The foregoing and other objects and advantages are obtained by the present invention, various novel features of which will be apparent from the description herein and the accompanying drawings disclosing a preferred embodiment of the invention, and will be more particularly pointed out in the appended claims.

FIG. 1 is a longitudinal, vertical sectional view through a vehicle clutch mechanism containing a clutch throw-out bearing assembly embodying the invention;

FIG. 2 is a fragmentary vertical sectional view taken generally along the line 2—2 of FIG. 1;

FIG. 3 is a perspective view of one of the leaf spring members reactively employed between the bearing-carrier element and the hanger support therefor;

FIG. 4 is a view similar to FIG. 1 but showing the relative positions of the throw-out bearing elements and the clutch operating fingers at the instant of touch and at the instant of break-off of engagement therebetween; and FIG. 5 is a top plan view, in slightly enlarged dimensions, of the bearing-carrier element incorporated in the bearing assembly of the present invention.

Referring now to the drawings, where there is depicted a preferred embodiment of the invention, it will be noted that the invention is shown as employed in association with a conventional vehicle clutch mechanism although it will be appreciated that its application is not to be limited to the specific type clutch herein illustrated. The clutch, indicated generally by the reference numeral 10 and enclosed in a housing 11, is driven by a shaft, such as the crankshaft 12 of the vehicle power plant (not shown), and includes a flywheel 12a affixed to said shaft for rotation therewith, and a driven or output shaft 13 that carries a disengageable clutch plate 14. The driving shaft 12 and driven shaft 13 are normally coupled together by the cooperating clutch surfaces shown at 15 and are held tightly in engagement by pressure means such as the springs 16, as is well understood in clutch mechanisms of this conventional variety.

The clutch is adapted for disengagement at the will of the operator by means of a clutch throw-out actuating or control rod 17, usually connected at one end to the clutch pedal of the vehicle and not shown, and pivotally connected at its opposite end to a release bearing hanger, such as indicated generally by the numeral 18. Said hanger bracket is fashioned to resemble a yoke or bail and may include a pair of spaced apart and generally parallel arms 19, 19a that are inwardly offset and brought together at one end to provide a mounting member for a pivot pin 20 which serves to pivotally attach a bifurcated end 21 of the control rod 17 thereto. The opposite ends of the arms 19, 19a, of hanger 18, are pivotally supported by an elongated rod-like headless pin or shaft 22 the opposite ends of which are positioned in respective openings 23, 23a provided in the side walls of the clutch housing 11 and fixed against displacement from said openings by any suitable means, such as the conventional cotter pins indicated at 24, 24a. As thus arranged the control rod 17, when reciprocated on an axis substantially parallel to that of the driven shaft 13, functions to pivotally swing the yoke-like hanger or bracket 18 about its supporting pivots.

A collar-like release bearing carrier, indicated generally by the reference numeral 25, is fashioned with a central body portion 26 from which extends in opposite directions a pair of arms or branches 27, 27a and the outer ends of said arms have reduced section portions thereon that provide trunnions 28, 28a for journalling said carrier. At the junction of said trunnions with the respective arms the vertical end walls of said arms form shoulders, such as shown at 29, 29a, the purpose of which will subsequently be better understood. The carrier 25 has a central axially extending opening 30 which is of non-uniform diameter therethrough and shaped to generally resemble an hour-glass figure and is dimensioned to accommodate in slightly spaced relation the driven shaft 13 which is centered therewithin. One face of the collar or carrier body portion 26 has a portion thereof cut-away, as best seen in FIG. 5, to provide an annular ledge or shoulder 31 and an axially extending hub portion 32 for supporting and abuttingly receiving a clutch releasing anti-friction thrust-transmitting device, such as the generally conventional caged ball-bearing assembly shown at 33, which is positioned thereover in tight fitting relationship but disposed so as not to restrict relative rotative movement between the inner and outer races and ball elements of said bearing as is well understood. The outwardly extending vertical face or surface 34, of bearing 33, is adapted for frictional engagement with the clutch fingers 35, of which there are usually three distributed peripherally around the clutch 10 but only one of which is shown in the drawings herein, so as to effect disengagement of the clutch which, of course, is normally held in coupling engagement by the springs 16 in clutches of this well known type.

As described thus far it will be appreciated that when the thrust ball-bearing assembly 33 is not in contacting engagement with the clutch fingers 35 the bearing carrier 25 is free to tilt or rotate sufficiently on its journalling trunnions 28, 28a to permit said bearing to come into contact with the rotating driven shaft 13 whereupon the rotatable elements of said ball-bearing assembly can then be set into rotation by virtue of the frictional contact thereof with said shaft. This, of course, is undesirable since it causes the bearing to rattle and be noisy, and produces unnecessary wear of the bearing components, and, additionally, it tends to have the bearing ride the clutch fingers particularly when the spacing or clearance tolerances therein are close. In order to eliminate such objectionable contingencies the hereinafter described frictional resistor or restraining means, for opposing free relative movement between such elements, was invented.

In FIG. 3 there is illustrated a perspective view of a leaf spring, indicated generally by the reference numeral 36, which it is proposed be positioned in a compressibly pre-stressed condition between each of the trunnion shoulders 29, 29a and the respective bearing hanger arms 19, 19a. Each such spring 36 is fashioned with a central body portion 37, and slightly curved or upstanding end portions 38, 38a so that the unit is shaped to generally resemble an archery bow substantially conforming with the curved conformation shown in the attached drawings. Each such spring, preferably, is fashioned from a spring steel or other suitable equivalent, long wearing and dependable resilient material and is formed with turned-over ear-like gripping finger portions 39, 40 extending substantially normal to the central body portion thereof. An aperture 41, in the center of each spring member, is dimensioned to receive in loosely accommodating fashion a respective trunnion member 28 or 28a while the overturned ears or gripping fingers 39, 40 thereof are spaced apart a distance sufficient to tightly slide over in overlapping relationship and thence grip the opposite side surfaces of respective carrier arms 27, 27a. As thus positioned the curved or bowed end portions 38, 38a, of each spring, reactively abut or bear against the respective hanger arms 19 and 19a and thereby compressibly urge the trunnion ends toward one another. Now, when the carrier 25 is rotated on its trunnions the springs 36, 36, because of the overlapping positions of the gripping ears 39, 40 on the opposite side surfaces of the carrier arms 27, 27a, will be constrained to rotate therewith, while the curved end portions 38, 38a of said springs will ride over or slide in tightly abutting relation against the surfaces of the respective hanger arms 19, 19a. In this manner the carrier 25 is prevented from freely or accidentally tilting or rotating on its trunnion axis out of a preset position and the bearing carried therein is thereby restrained against undesired contact with the rotating output shaft 13. This being the case the rotatable elements of the bearing assembly 33 will rotate only when said bearing unit is in direct engagement with the rotating fingers 35 of the clutch mechanism as a result of actuation by the control rod 17.

From the above it will be appreciated that in the proposed device the throw-out bearing will be self-aligning even after adjustment has been made to the clutch to compensate for wear thereof, and, furthermore, the proposed throwout bearing will be able to suitably maintain the necessary proper alignment between repeated successive operations of the clutch mechanism.

While only one form of the invention has been shown, it will be obvious to those skilled in the art that it is not so limited, but is susceptible of various modifications and changes without departing from the spirit hereof, and it is desired, therefore, the only such limitations shall be placed thereon as are specifically set forth in the appended claims.

What is claimed is:

1. A clutch throw-out device, comprising: hanger means adapted for pivotal connection to a support at one end and for connection at the other end thereof to an actuating member; bearing carrier means pivotally mounted for rotation in said hanger means and fashioned with an aperture therethrough; anti-friction bearing means mounted on said bearing carrier means and having an aperture therethrough coaxial with the aperture of said bearing carrier means and adapted to accommodate in radially spaced relation therewithin a driven shaft of an associated clutch mechanism; and resilient means compressibly disposed between said bearing carrier means and said hanger means and arranged so that the reactive force of said resilient means therebetween is operative along the axis of rotation of said bearing carrier means relative to said hanger means for opposing free relative movement between said bearing carrier means and said hanger means.

2. A clutch throw-out device, comprising: a hanger yoke having a pair of parallel arms spaced apart at one end and joined at the other end thereof, and having said hanger yoke adapted for pivotal mounting at the spaced apart ends thereof on a support and for connection to an actuating member at the joined ends; a bearing carrier fashioned with an aperture therethrough and having radially disposed trunnions extending oppositely therefrom, and being pivotally mounted for rotation by said trunnions in the arms of said hanger yoke; ball-bearing thrust means fashioned with an aperture therethrough and being mounted on an outer periphery of said bearing carrier with the aperture thereof disposed in a coaxial relation to the aperture in said bearing carrier and adapted to accommodate in radially spaced relation therethrough a driven shaft of an associated clutch mechanism; and resilient means carried by said bearing carrier for rotation therewith and disposed in a prestressed compressed condition between said bearing carrier and said hanger yoke with the reactive force therebetween operative along the axis of rotation of said bearing carrier relative to said hanger yoke for imposing frictional resistance therebetween to oppose free relative movement of said bearing carrier with respect to said hanger yoke.

3. A clutch throw-out device, comprising: a hanger bracket fashioned with a pair of parallel arms spaced apart at one end and joined at the other end thereof, and being adapted for pivotal mounting at the spaced apart ends thereof on a support and for connection to an actuating member at the joined ends; a bearing carrier having a central body portion with coaxially disposed arms extending oppositely therefrom; said arms each having a reduced section end portion proximate an outer end thereof and having a radial wall defining a shoulder at the junction of the arm with a respective reduced section portion; said bearing carrier body being further fashioned with an annular recess extending axially inwardly from a face thereof, and further having an aperture provided through the center of said body; thrust transmitting means including a ball-bearing assembly fashioned with an aperture through the center thereof and being securely mounted in said annular recess and disposed so that the aperture therein is coaxial with the aperture in said bearing carrier body; said bearing carrier being pivotally mounted by said reduced section end portions for rotation in respective arms of said hanger bracket and disposed so that the aperture therein and the coaxial aperture of said ball-bearing assembly are adapted to accommodate in radially spaced relation therewithin a driven shaft of an associated clutch mechanism; and separate leaf spring means disposed in a prestressed compressed condition between the shoulder of each bearing carrier arm and a respective arm of said hanger bracket and being reactively operative therebetween and along the axis of rotation of said bearing carrier relative to said hanger bracket for restricting free relative movement between the bearing carrier and the hanger bracket.

4. A clutch throw-out device, comprising: a hanger bracket fashioned with a pair of parallel arms spaced apart at one end and joined at the other end thereof, and being adapted for pivotal mounting at the spaced apart ends thereof on a support and for connection to an actuating member at the joined ends; a bearing carrier having a central body portion with coaxially disposed arms having opposite faces thereon and having said arms extending oppositely from said body; said arms each having a reduced section end portion proximate an outer end thereof and having a radial wall defining a shoulder at the junction of the arm with a respective reduced section end portion; said bearing carrier body being further fashioned with an annular recess extending axially inwardly from a face thereon, and further having an aperture provided through the center of said body; thrust transmitting means including a ball-bearing assembly fashioned with an aperture through the center thereof and being securely mounted in said annular recess and disposed so that the aperture therein is coaxial with the aperture in said bearing carrier body; said bearing carrier being pivotally mounted by said reduced section end portions for rotation in the arms of said hanger bracket and disposed so that the aperture therein and the coaxial aperture of said ball-bearing assembly are adapted to accommodate in radially spaced relation therewithin a driven shaft of an associated clutch mechanism; and a separate leaf spring reactively disposed between each of the shoulders of said bearing carrier arms and a respective arm of said hanger bracket with the longitudinal axis of each such leaf spring being arranged normal to the axis of rotation of said bearing carrier relative to said hanger bracket so as to create a reactive force therebetween operative along the axis of rotation of said bearing carrier relative to said hanger bracket for opposing free relative movement between the bearing carrier and hanger bracket, each of said leaf springs having an opening therethrough for receiving a respective reduced section end portion of a bearing carrier arm and being further fashioned with inwardly turned spaced apart projections proximate the center of the spring and disposed to grippingly abut opposite faces of an associated bearing carrier arm so that when said spring is positioned over a respective reduced section end portion and in reactively abutting relation between a carrier arm shoulder and a proximate hanger bracket arm the spring is constrained to rotate with said bearing carrier as said bearing carrier rotates relative to said hanger bracket.

References Cited in the file of this patent
UNITED STATES PATENTS

| | | |
|---|---|---|
| 1,611,557 | Reed | Dec. 21, 1926 |
| 1,927,643 | Hughes | Sept. 19, 1933 |
| 1,930,276 | Lenz et al. | Oct. 10, 1933 |
| 2,157,429 | Padden | May 9, 1939 |
| 2,624,437 | Gardner | Jan. 6, 1953 |
| 2,725,965 | Binder | Dec. 6, 1955 |